(12) United States Patent
Mirsky et al.

(10) Patent No.: US 11,176,625 B2
(45) Date of Patent: Nov. 16, 2021

(54) SYSTEM OF UNIQUE IDENTIFICATION AND PERSONALIZATION OF HYGIENIC AND DOMESTIC ITEMS IN HOTEL OR HOSPITALITY ESTABLISHMENT

(71) Applicants: Jerry Mirsky, Owings Mills, MD (US); Boris Kokotov, Baltimore, MD (US); Yaroslav Tsagoyko, Potomac, MD (US)

(72) Inventors: Jerry Mirsky, Owings Mills, MD (US); Boris Kokotov, Baltimore, MD (US); Yaroslav Tsagoyko, Potomac, MD (US)

( * ) Notice: Subject to any disclaimer, the term of this patent is extended or adjusted under 35 U.S.C. 154(b) by 518 days.

(21) Appl. No.: 15/834,924

(22) Filed: Dec. 7, 2017

(65) Prior Publication Data
US 2019/0180390 A1 Jun. 13, 2019
US 2020/0151834 A9 May 14, 2020

Related U.S. Application Data

(63) Continuation-in-part of application No. 14/523,933, filed on Oct. 26, 2014, now abandoned.

(51) Int. Cl.
*G06Q 30/00* (2012.01)
*G06Q 50/12* (2012.01)
*G06Q 30/06* (2012.01)

(52) U.S. Cl.
CPC ......... *G06Q 50/12* (2013.01); *G06Q 30/0621* (2013.01)

(58) Field of Classification Search
CPC .......................... G06Q 50/12; G06Q 30/0621
USPC ................................................ 705/26.1–27.2
See application file for complete search history.

(56) References Cited

U.S. PATENT DOCUMENTS

| 9,208,444 B1* | 12/2015 | Zheng | G06Q 30/0201 |
| 2009/0002185 A1* | 1/2009 | Chu | G08B 21/24 |
| | | | 340/666 |
| 2010/0015415 A1* | 1/2010 | Hurst | G09F 23/00 |
| | | | 428/195.1 |

OTHER PUBLICATIONS

What's Next; Personalized Amenities, Published Nov. 27, 2005, The New York Times, <http://query.nytimes.com/gst/fullpage.html?res=9D0CE0DB1F3EF934A15752C1A9639C8B63> (Year: 2005).*

* cited by examiner

*Primary Examiner* — Anand Loharikar
(74) *Attorney, Agent, or Firm* — US IP Attorneys, P.C.; Timothy Marc Shropshire

(57) ABSTRACT

A method of distributing personalized hygienic and disposable items to a group of hotel guests where the hygienic and disposable items match a selected distinctive array wherein each user receives a set of items so as to avoid mixing use between a plurality of guests.

13 Claims, 2 Drawing Sheets

Figure 1:
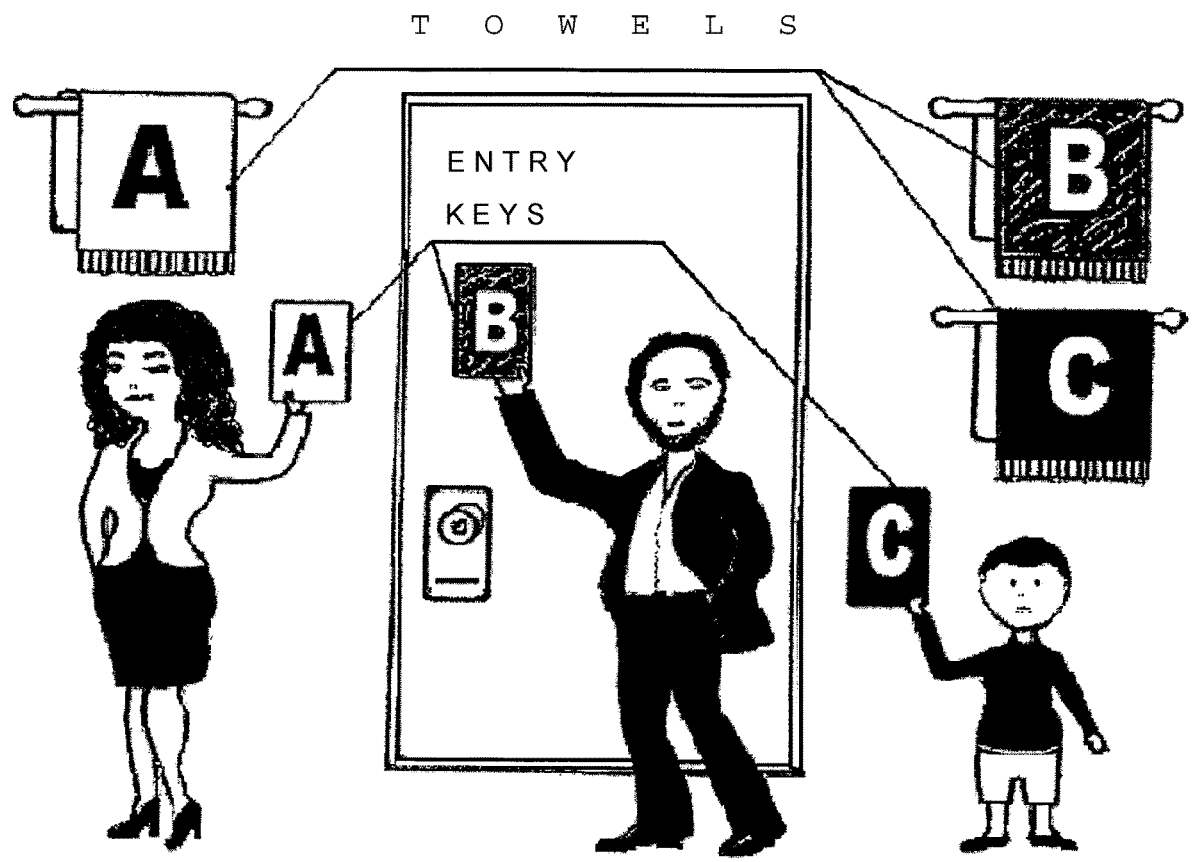

EACH GUEST RECEIVES AN ENTRY KEY AND, UPON ENTERING THE ROOM, HE/SHE UNDERSTANDS WHO OWNS WHICH TOWEL.

EACH GUEST RECEIVES AN ENTRY KEY AND, UPON ENTERING THE ROOM, HE/SHE UNDERSTANDS WHO OWNS WHICH TOWEL.

SINGLE-OCCUPANCY ROOMS MUST BE UNDERSTOOD AS POSSIBLY ACCOMMODATING DOUBLE-OCCUPANCY.

SYSTEM OF UNIQUE IDENTIFICATION AND PERSONALIZATION OF HYGIENIC AND DOMESTIC ITEMS IN HOTEL OR HOSPITALITY ESTABLISHMENT

CROSS-REFERENCE TO RELATED APPLICATION(S)

The present application claims priority to application Ser. No. 14/523,933 filed on Oct. 26, 2014, entitled "Method of personalization and securing hygiene of items in hotels and dorms" the entire disclosure of which is incorporated by reference herein.

BACKGROUND OF THE INVENTION

Field of Invention

This invention relates to a system and method of uniquely identifying and associating a set of personal hygienic and domestic items to one or more individuals. In most hotels, dorms, and other places where guests are frequently accommodated, people often rely on personal items provided by the given hospitality establishment. While people often bring travel bags filled with personal belongings and toiletries, it is unreasonable to travel long distances with all their belongings from home. It has become common practice across the United States and in foreign countries for hotels, hostels, and lodging facilities to provide basic toiletries such as shampoo, toilet paper, and other belongings.

Further, five star hotels and other high end residences can provide a guest with personal and hygienic items far beyond what a guest might ordinarily use in their house such as robes, slippers, and further means for overall health, well-being, and beauty.

Description of Related Art

Prior art consists of a method of customizing personal disposable and non-disposable hygienic items in hotels or other places of guest accommodation by assigning a distinct feature or a combination of features such as color, shape, ornament, or texture being attached to an item prior to be distributed to a guest. However, prior art is often distributed to a guest only after a guest checks in, and later has requested a certain setting such as providing for two towels or robes in a honeymoon suite at a hotel on their wedding night.

The inability to distinguish between personal items distributed by a lodging establishment, as seen in the prior art, could have a number of undesirable and/or dire consequences. As an example, a family (e.g., parents accompanied by children) arrives at a hotel and all of the towels in the hotel room are white. One son dries himself off with a towel and hangs it on the bathroom wall. Mistakenly, the second son claims the towel on the wall is his, causing a vicious fight between the sons.

As another, more serious example, two or more individuals/guests rent a hotel room. All of the towels provided are indistinguishable from one another. After a few hours, all of towels are used up and one of the guests unknowingly/mistakenly dries himself/herself off with another guest's towel, contracts an infectious disease, and dies.

In addition to the foregoing, knowing that travel can be stressful, lodging establishments try to create a comfortable environment to allow guests to feel at home. However, there is currently no system for lodging establishments to know or anticipate guests' preferences, e.g., favorite colors. etc.

Based on the foregoing, there is a need in the art for a personalization and identification system that includes a customized set of items provided to a guest of a lodging establishment, whereby an identification indicia, unique to the guest, is displayed on each item of the set of items. The system may be further customizable to provide a multi-level array of features unique to each guest.

SUMMARY OF THE INVENTION

The present invention overcomes the deficiencies of the prior art by providing a method wherein both the guest and a hospitality establishment can communicate with one another to improve overall hygiene during a stay while also allowing for greater customer choice in their personal items to be used during a temporary stay.

The present invention presents a method and apparatus that allow for both parties to ascertain personal guest data such as demographic and more specific information pertinent to their stay.

In an embodiment of the invention, a method of using a set of embellishments to temporarily identify disposable and non-disposable items within a group of guests sharing a hotel room is presented. For example, if friends were out going on a short vacation to the country and visiting local wineries, the hotel could ascertain this information prior to the trip and then utilize a set of different shaped wine glasses or bottles to assigned to each guest, wherein a given charm or key card would allow the guest to know her towel, toothbrush, or other toiletry belonging to her. This practice helps to further avoid any spreading of germs or bacteria which can frequently occur when multiple people are sharing the same hygienic items whether on purpose or by accident.

The foregoing, and other features and advantages of the invention, will be apparent from the following, more particular description of the preferred embodiments of the invention, the accompanying drawings, and the claims.

For a more complete understanding of the present invention, the objects and advantages thereof, reference is now made to the ensuing descriptions taken in connection with the accompanying drawings briefly described as follows.

Figure 2:
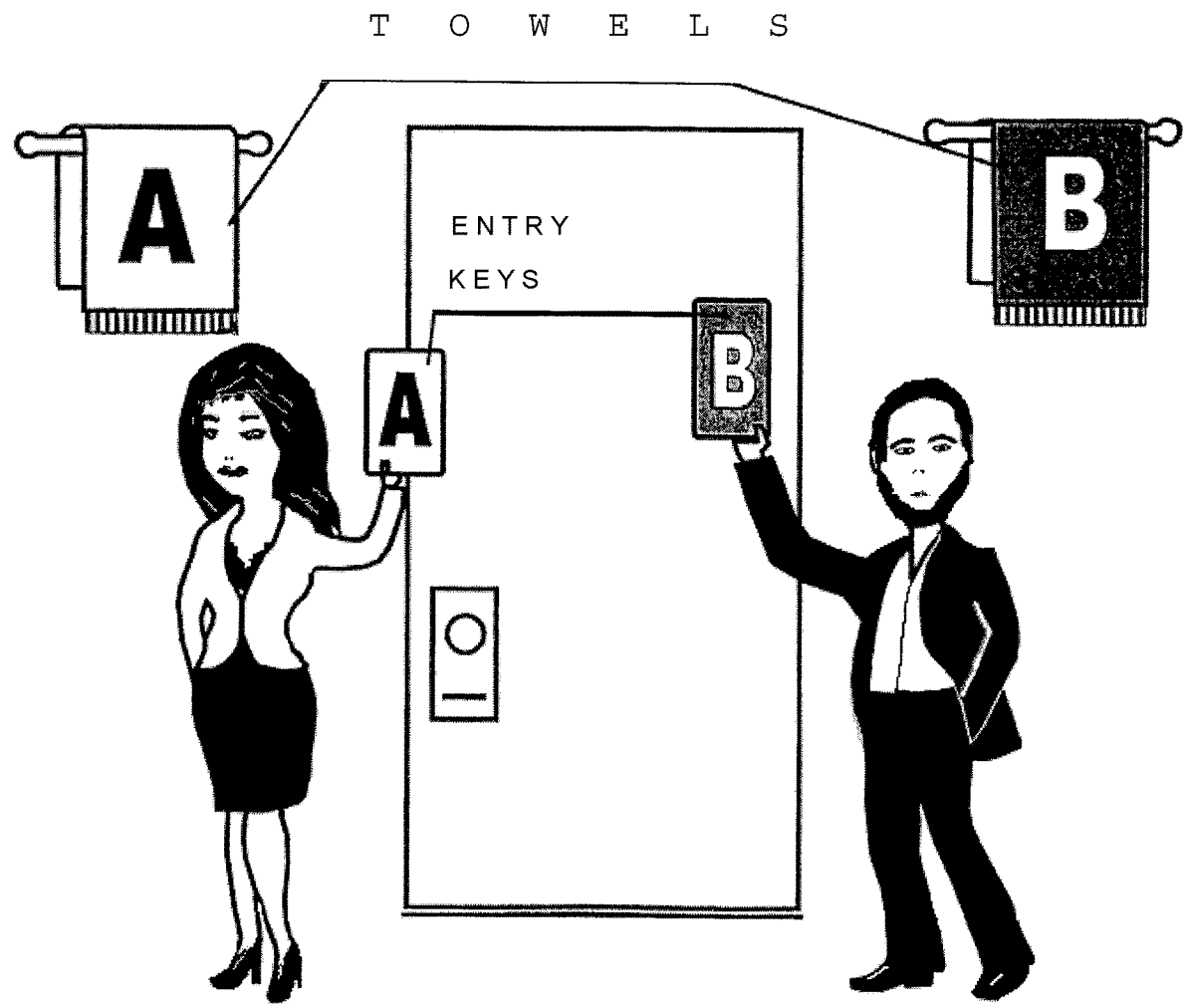

FIG. 1 shows the personalization and identification system, according to an embodiment of the present invention, wherein the guest can identify which items belongs to him/her, based on the identification indicia displayed on his/her key card; and FIG. 2 shows the personalization and identification system, according to an embodiment of the present invention, wherein the guest registers as a single occupant but is accommodated as other than single, based on information available to the lodging establishment.

DETAILED DESCRIPTION OF PREFERRED EMBODIMENTS

The present invention provides for a method and system of enabling personalization of items to be used in a hospitality establishment. The present invention further provides for an electronic means to ascertain personal information about a single guest or group of guests scheduled to stay in a given establishment.

In an embodiment, a computerized information system would provide for an infrastructure wherein the hotel or lodging establishment would have a network server and interface capable of communicating with a plurality of mobile devices. Over the internet, or through wireless and cellular networks, a potential guest could book a trip for a flexible amount of time. Upon requesting to stay at the establishment, the establishment network server could send requests to a first user to gain further information such as number of nights to stay, number of guests, as well as ancillary personal information about each guest coming on the trip. Additionally, the server could present a visual display prompting the guests to provide further information about the reason for the trip, and presenting local interests that may of interest to the guest.

In an alternative embodiment, the network server can request social media profiles of the potential guests and establish basic categories of personally identifiable data based on categories such as male, female, adult, adolescent, married, single, or others.

References to "guest" or "user", or any similar term, as used herein is generally intended to mean third parties other than the hospitality establishment. Hence, it is contemplated that there may be a multiplicity of different types of "user" near the end stage of the usage process. Where applicable, especially with respect to distribution channels of embodiments of the invention comprising consumed retail products/services thereof examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

A user wishing to store or edit his or personal information may access a hotel network server through a private portal using a combination of private and public networks to access the network data terminal. It is important that the guest or user would only be able to configure access permissions for his or her own personalized information. After a user or guest has been authenticated, she may edit the personalized information of the user in a network storage server.

In an alternative embodiment, the network server could allow for permissions to be edited so that a mother or father of children under the age of 13 could access and alter personal information, likes, and dislikes of a child to be stored in a network server.

As the process of booking hotel rooms increasingly takes place over the internet, most hospitality establishments will have a digital information system to provide the architecture for the present invention. However, the claimed system provides for a server framework which adds meaningful limitations to impart patent eligibility for an improvement over what is currently available in the field of guest personalization. The claimed system retrieves information from a guests' social media profile, and can store personally identifiable information such as preferences, age, and common interests amongst a plurality of servers so as to avoid all guest personal information on a hotel server network.

In an embodiment, the claimed invention is able to provide customizable filtering at a remote storage level by taking advantage of the technical capability of certain communication networks. See *BASCOM Global Internet Services, Inc.* v. *AT&T Mobility LLC* (Fed. Cir. Jun. 27, 2016).

Due to the rise in domestic of violent events such as the Las Vegas incident, there is a public need for increasing the amount of knowledge a hotel or hospitality establishment has about any incoming guests. Hotels across America will likely be placing a higher emphasis on budgeting for securing the safety of their guests, as well as protecting private information. The present invention provides for a retrieval system as well as a distributed architecture to minimize the impact of a guests' private information from being accessed by a third party user who did not create the guest attribute data.

Once all personal guest data is captured and stored prior to the guest arrival, the hotel can use an in house system to organize the proper number of hygienic and personal items to be distributed to a room. The system can also determine the ideal allotment of items to each individual per room.

In a preferred embodiment, the number of arrays or personalized items would be equal to the number of guests staying in the room so that each guest in a given room will receive a set of clearly identified personal items. This embodiment may enhance the overall guest experience as each individual will appreciate the esthetic nature of a hotel willing to provide such a focal point on the guest immediately upon arriving with in the room.

Once the guests are in the room, it is an object of the present invention to provide for an identification system wherein one or more disposable and hygienic items are configured to have a distinguishing array affixed to an item or set of items. Each item may be capable of bearing an indicium on an outer surface of the item wherein the indicium bears a connection to the personal guest data submitted by the guest prior to arrival.

Each guest item would have a plurality of affixation means configured to be permanently attached or removably attached wherein the identification device would be uniform across a set of items. In an embodiment the individual specific indicium could be affixed with a hook and loop material, a magnet, or other means of connection.

In an embodiment, a guest would receive a magnetic keycard or a key charm that shall bear the same distinct feature as the rest of personal items to be used by this guest. In his hotel or dorm room the guest shall find that dishes, bedding, carpet, lampshades, towels, slippers, robes, toothbrushes, shower caps and other disposable and non-disposable hygienic and domestic items meant for his personal use have the same distinctive feature.

In an embodiment, guests would be able to request additional sets of domestic and hygienic items of their choice. For example, a group of two guests could request multiple sets of items such that the first guest could request 2 sets, and the second guest could request 3 sets. This embodiment would allow for guests in a hotel who anticipate or by chance welcome in additional guests to occupy for the room for short periods of time. This embodiment can be utilized in hotels and motels of varying cost and size. In another embodiment, there is a possibility of a temporal belonging of objects to have a preliminary marking with personally identifiable information such as surname or social security number of a guest. Further, items can be assigned temporary ownership of a new item that is unmarked.

In an alternative embodiment, the distinctive charms or toiletry items would comprise a visual indicator such as a digital screen which could impose a variety of images which have sentimental value to the guest. For example, if a guest had a favorite sports team, the logo or highlight reels could be affixed to a bottle, hair dryer, or other non-disposable item suitable for guest use in a hotel room.

In a preferred embodiment, the distinctive feature may have a singular or multiple visual cues to signal to a user that the garment or toiletry is theirs. In an embodiment, the distinctive feature may comprise color, shape, ornament, style, textures, embroidery, pattern, label, or any other image being a part of the item or being attached to the item prior to distributing it to a quest.

In an embodiment, the hotel can store hygienic and disposable items which have a plurality of identification indicia configured to be displayed on a wide variety of items. The identification indicia would be affixed or attached to a variety of items not limited to bedding, towels, slippers, robes, toothbrushes, and hair dryers. The indicia signify to the guest or user that it belongs to him or her through olfactory, color, shape, ornament, style pattern or a label. Additionally, the objects could use a digital means, e.g., a digital screen, to display or convey that the item belongs to a specific guest or user such as displaying the surname of a guest.

In an embodiment, the invention provides a method for the hotel to establish and disseminate personalized hygienic and disposable items to a group or hotel guests by allowing for a first user to select a distinctive array for their objects. This method can be applied to a plurality of users since it is common for hotels to offer rooms to accommodate anywhere from 1-20 guests in a single lodging place. The hotel would then lie out or disburse to the room a set of ornamental hygienic items to the guests prior to their arrival. In an alternative embodiment, a system could present these objects either to hotel staff which prepare and clean rooms or at the front check in desk.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A computerized personalization and identification system comprising:
   a network server of a lodging establishment; and
   a mobile device of a guest of the lodging establishment, the mobile device being communicatively coupled to the network server via the Internet or through wireless and cellular networks,
   wherein the network server is configured to:
      generate a user interface displayed on the mobile device prior to check-in;
      request, via the user interface, personal information from the guest and access to social media profiles of the guest to obtain personal data of the guest;
      determine at least one identification indicium unique to the guest, based on at least one of the personal information and the personal data;
      determine, utilizing the guest's social media profile, whether the guest is single, wherein, if the guest is not single and requests a single-occupancy room, at least two sets of items are assigned to the guest's room, wherein each set of the at least two sets of items are distinct from one another; and
      communicate to the lodging establishment the at least one identification indicium and whether the guest is single,
   wherein the lodging establishment displays the at least one identification indicium on each item of a set of items provided to the guest.

2. The system of claim 1, wherein said each item comprises an attachment mechanism, wherein the attachment mechanism is configured to couple to an object.

3. The system of claim 1, wherein a part of said each item comprises at least one distinctive feature, wherein the part of said each item is separate and distinct from the at least one identification indicium, wherein the at least one distinctive feature of the part of said each item is the same on said each item and is unique to the guest.

4. The system of claim 1, wherein said each item comprises a digital screen.

5. The system of claim 2, wherein the object is nondisposable.

6. The system of claim 4, wherein the digital screen is configured to display a variety of digital images unique to the guest.

7. The system of claim 1, wherein the at least one identification indicium comprises an attribute selected by the guest.

8. The system of claim 1, further comprising
   a key card provided to the guest,
   wherein the key card includes the at least one identification indicium displayed on the set of items.

9. The system of claim 8, wherein said each item comprises an attachment mechanism, wherein the attachment mechanism is configured to couple to an object.

10. The system of claim 9, wherein the object is nondisposable.

11. The system of claim 8, wherein said each item further comprises a digital screen.

12. The system of claim 11, wherein the digital screen is configured to display a variety of digital images unique to the guest.

13. The system of claim 8, wherein the at least one identification indicium comprises an attribute selected by the guest.

* * * * *